United States Patent
Tan et al.

(10) Patent No.: US 12,433,493 B2
(45) Date of Patent: Oct. 7, 2025

(54) MEDICAL DEVICE, AND MULTI-WORKING MODE MONITORING CONFIGURATION METHOD AND APPARATUS USED FOR MEDICAL DEVICE

(71) Applicants: SHENZHEN MINDRAY BIO-MEDICAL ELECTRONICS CO., LTD., Shenzhen (CN); Shenzhen Mindray Scientific Co., Ltd., Shenzhen (CN)

(72) Inventors: Lin Tan, Shenzhen (CN); Jianhui Zhang, Shenzhen (CN); Xia Jiang, Shenzhen (CN)

(73) Assignees: SHENZHEN MINDRAY BIO-MEDICAL ELECTRONICS CO., LTD., Shenzhen (CN); Shenzhen Mindray Scientific Co., Ltd., Shenzhen (CN)

( * ) Notice: Subject to any disclaimer, the term of this patent is extended or adjusted under 35 U.S.C. 154(b) by 729 days.

(21) Appl. No.: 17/239,661

(22) Filed: Apr. 25, 2021

(65) Prior Publication Data
US 2021/0244290 A1    Aug. 12, 2021

Related U.S. Application Data

(63) Continuation of application No. PCT/CN2018/112125, filed on Oct. 26, 2018.

(51) Int. Cl.
*A61B 5/0205* (2006.01)
*A61B 5/00* (2006.01)
(Continued)

(52) U.S. Cl.
CPC .......... *A61B 5/0205* (2013.01); *A61B 5/4836* (2013.01); *A61B 5/6801* (2013.01);
(Continued)

(58) Field of Classification Search
CPC ... A61B 5/0205; A61B 5/4836; A61B 5/6801; A61B 5/742; A61B 2503/045; G16H 10/60; G16H 50/20; G16H 20/40
See application file for complete search history.

(56) References Cited

U.S. PATENT DOCUMENTS 6,458,081 B1   10/2002  Matsui
2004/0254465 A1   12/2004  Sano
(Continued)

FOREIGN PATENT DOCUMENTS

CN    2657305 Y    11/2004
CN    101161212 A   4/2008
(Continued)

OTHER PUBLICATIONS

WIPO translation of CN 103110404 (Year: 2013).*
(Continued)

*Primary Examiner* — Brian T Gedeon
(74) *Attorney, Agent, or Firm* — Syncoda LLC; Feng Ma

(57) ABSTRACT

A medical apparatus, comprising: a memory, which pre-stores multiple working modes, wherein the working modes comprise a plurality of workflows, tools associated with the workflows, and constraint relationships for executing the workflows; and a processor, if the working state of the medical device meets a switching condition, switching is performed among multiple working modes; when a switched working mode is executed, each workflow is executed in sequence according to constraint conditions for executing each workflow in a workflow set, and when each workflow is executed, the tools associated with the workflows are called.

9 Claims, 6 Drawing Sheets

(51) Int. Cl.
*G16H 10/60* (2018.01)
*G16H 20/40* (2018.01)
*G16H 40/63* (2018.01)
*G16H 50/20* (2018.01)

(52) U.S. Cl.
CPC .............. *A61B 5/742* (2013.01); *G16H 10/60* (2018.01); *G16H 50/20* (2018.01); *A61B 2503/045* (2013.01)

(56) References Cited

U.S. PATENT DOCUMENTS

| | | | |
|---|---|---|---|
| 2008/0319275 A1* | 12/2008 | Chiu | A61B 5/0002 600/300 |
| 2010/0049050 A1 | 2/2010 | Pelissier | |
| 2010/0056875 A1 | 3/2010 | Schoenberg et al. | |
| 2017/0147759 A1* | 5/2017 | Iyer | G16H 70/20 |

FOREIGN PATENT DOCUMENTS

| | | | |
|---|---|---|---|
| CN | 102525651 A | 7/2012 | |
| CN | 103110404 A | 5/2013 | |
| CN | 103870220 A | 6/2014 | |
| CN | 106466178 A | 3/2017 | |
| CN | 106821350 A | 6/2017 | |
| WO | 2016023229 A1 | 2/2016 | |
| WO | WO-2018040110 A1 * | 3/2018 | ............... A61B 5/00 |

OTHER PUBLICATIONS 8 (Year: 2018).*
International Search Report issued in corresponding International Application No. PCT/CN2018/112125, mailed Jul. 5, 2018, 4 pages.
First Office Action issued in related Chinese Application No. 201880098994.1, mailed Feb. 28, 2024, 13 pages.
Second Office Action issued in related Chinese Application No. 201880098994.1, mailed Aug. 13, 2024, 12 pages.

* cited by examiner

MEDICAL DEVICE, AND MULTI-WORKING MODE MONITORING CONFIGURATION METHOD AND APPARATUS USED FOR MEDICAL DEVICE

CROSS-REFERENCE OF RELATED APPLICATIONS

This is a bypass continuation application of International Application No. PCT/CN2018/112125, entitled "Medical Device, and Multi-Working Mode Monitoring Configuration Method and Apparatus Used for Medical Device," filed Oct. 26, 2018, the content of which is incorporated by reference herein in its entirety.

TECHNICAL FIELD

The present application relates to the technical field of medical devices, and in particular, to a medical device, and a multi-working mode setting method and apparatus for the medical device.

BACKGROUND

In the medical field, there are a wide variety of clinical scenarios for different patients and diseases, and in different clinical scenarios, different handling measures for monitoring, treatment, nursing, or diagnosis are required. For example, monitored parameters for severely ill newborns are significantly different from those for severely ill adults. For another example, vital signs of patients undergoing surgery vary with the induction, maintenance, and resuscitation stages of the surgical procedure, and parameters that need to be monitored are also varying.

At present, medical devices for clinical use require an operator to manually call and combine various functional modules, resulting in high operational complexity and low work efficiency.

SUMMARY

According to a first aspect, the present application provides a multi-working mode setting method for a medical device, comprising:
  obtaining medical data of a monitored object;
  determining a vital sign state of the monitored object according to the medical data;
  determining, in a preset working mode library, a target working mode corresponding to the vital sign state, wherein the preset working mode library comprises a plurality of working modes, and provides a correspondence between each working mode and a corresponding vital sign state; and
  executing the target working mode.

According to a second aspect, the present application provides a multi-working mode setting method for a medical device, comprising:
  reading medical parameter setting information of another medical device connected to the medical device;
  setting a target working mode of the medical device corresponding to the medical parameter setting information, wherein the target working mode is used to reflect a medical effect of medical parameters in the medical parameter setting information; and
  executing the target working mode.

According to a third aspect, the present application provides a multi-working mode setting method for a medical device, comprising:
  detecting that a vital sign parameter acquisition apparatus is connected to the medical device;
  determining a parameter type of a vital sign parameter acquired by the vital sign parameter acquisition apparatus;
  determining a target working mode corresponding to the parameter type of the vital sign parameter, wherein the target working mode comprises at least one of display interface layout configuration information of the medical device and workflow configuration information of the medical device; and
  executing the target working mode.

According to a fourth aspect, the present application provides a multi-working mode setting method for a medical device, comprising:
  detecting that a vital sign parameter acquisition apparatus is connected to the medical device;
  determining a parameter type of a vital sign parameter acquired by the vital sign parameter acquisition apparatus;
  determining a target working mode corresponding to the parameter type of the vital sign parameter, wherein the target working mode comprises at least one of display interface layout configuration information of the medical device and workflow configuration information of the medical device; and
  executing the target working mode.

According to a fifth aspect, the present application provides a medical device, comprising:
  a memory, which pre-stores a plurality of working modes, wherein the working mode comprises several workflows, tools associated with the workflows, and constraint relationships for executing the workflows; and
  a processor, which, if a working state of the medical device meets a switching condition, switches between the plurality of working modes, and when a switched working mode is executed, executes the workflows in sequence according to the constraint conditions for executing the workflows in the workflow set, and calls tools associated with the workflows in a process of executing the workflows.

According to a sixth aspect, the present application provides a medical device, comprising:
  a memory, which stores program instructions; and
  a processor, which executes the program instructions to implement the steps of any of the above multi-working mode setting methods for a medical device.

According to a seventh aspect, the present application provides a readable storage medium storing a computer program, wherein when the computer program is loaded and executed by a processor, any of the above multi-working mode setting methods for a medical device is implemented.

BRIEF DESCRIPTION OF THE DRAWINGS

In order to more clearly describe the technical solutions in the embodiments of the disclosure or in the prior art, the drawings required for describing the embodiments or the prior art will be briefly described below. Apparently, the drawings in the following description show only some of the embodiments of the disclosure, and those of ordinary skill in the art may still derive other drawings from these drawings without involving any inventive effort.

DESCRIPTION OF THE PREFERRED EMBODIMENTS

The technical solutions of the embodiments of the present application will be described below clearly and comprehensively in conjunction with accompanying drawings of the embodiments of the present application. Apparently, the embodiments described are merely some of, rather than all of, the embodiments of the present application. Based on the embodiments in the present application, all other embodiments that would be derived by those of ordinary skill in the art without involving any inventive effort shall all fall within the scope of protection of the present application.

In the medical field, patients in different clinical scenarios have different vital sign states, and nursing or treatment measures required for the patients are also different. Clinical scenarios may differ in that different medical care measures are required for different patients, or in that medical care measures received by the same patient are adjusted as the clinical status changes.

Clinically, medical staff need to use a medical device to do auxiliary work. For higher applicability, the medical device may be equipped with a plurality of application modules. Combining different application modules according to the needs of different medical procedures can provide working modes with different medical care functions.

In different medical care scenarios, the medical device needs to provide different working modes in line with clinical needs, so as to provide the best device use effect for the patient's treatment process. An existing medical device completely relies on the manual operation of the medical staff, that is, the medical staff manually select required modules from the application modules of the medical device according to actual needs, and set the order of execution of the selected modules, so as to obtain a required working mode by combination. Such a manual setting manner is relatively complicated for an operator and has relatively low setting efficiency.

Figure 1:
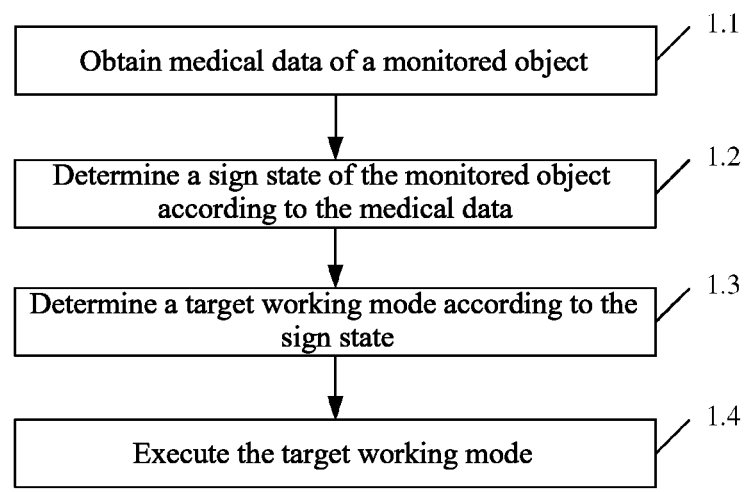
FIGS. 1 and 2 are two flowcharts of a multi-working mode setting method for a medical device.

The present application provides a multi-working mode setting method for a medical device. As shown in FIG. 1, the method may specifically comprise step 1.1 to step 1.4 as follows.

Step 1.1: Medical data of a monitored object is obtained.

The monitored object may be any object that has a monitoring requirement in an actual application scenario.

There may be many manners of obtaining the medical data.

One obtaining manner may be obtaining the medical data from data pre-stored in a storage device. Specifically, for example, the monitored object is equipped with a wearable device, and the device records medical data related to the monitored object, such that the medical data of the monitored object can be read from the wearable device of the monitored object. Specifically, for another example, in order to manage information of a large number of patients, an electronic medical record system is provided, and records related information of these patients, such that the medical data of the monitored object can be obtained from the electronic medical record system. The patient information contained in the electronic medical record system may comprise personal information data such as population information, family medical history, and personal medical history, and may further comprise physiological data such as vital sign monitored data, biochemical examination data, and image data.

In a specific application scenario, a patient is equipped with a wearable device such as a wristband. The wristband records some personal information data of the patient, such as age, gender, medical history, and symptoms, and the medical device can directly read, from the wristband, medical data required for the patient. Alternatively, the wristband records the patient's identity, such as a social security number or a hospital admission number, and the patient's identity can be read from the wristband, such that the patient's detailed medical data can be read from the electronic medical record system using the identity.

Another obtaining manner may be obtaining the medical data from real-time monitored data of the monitored object. Specifically, a vital sign parameter acquisition apparatus may be used to acquire vital sign parameters of the monitored object, and then physiological data of the monitored object is identified from the acquired vital sign parameter information.

In a specific application scenario, medical device accessories are used to acquire vital sign signals such as body temperature, respiration rate, blood pressure, and blood oxygen of the patient, and various physiological data of the monitored object can be obtained from the acquired vital sign signals.

Still another obtaining manner may be obtaining the medical data from an input device of the medical device. Specifically, if a monitored object needs to be monitored, the medical device may receive external input data, and a user, such as medical staff, may enter the medical data of the monitored object into the medical device via the input device.

The medical device may display the medical data in various forms, such as characters, sounds, and images.

Specifically, the medical data may comprise one or more of the following items: personal information data, physiological data, nursing data, and treatment data. Certainly, other related data that can be used to achieve the objective of the present application can also be included.

The personal information data, namely basic information of the monitored object, includes but is not limited to population information (such as age, gender, and race), family medical history, personal medical history, etc. The physiological data is physiological state data of the monitored object, including but not limited to vital sign monitored data, biochemical test data, imaging examination data, clinical observation data, etc. The nursing data represents data related to clinical nursing operations performed on the monitored object. The clinical nursing operations are, for example, sputum suction, administration, body scrubbing, and feeding, and the nursing data may comprise the occurrence time of the clinical nursing operations, etc. The treatment data represents data related to the treatment process of the monitored object, including but not limited to the following items: treatment drug information such as treatment drug name, drug concentration, and medication strategy, treatment operation information such as mechanical ventilation with a ventilator, diagnostic test information such as passive leg raise test, and patient status evaluation such as lung status evaluation, heart bypass, and first-aid cardiopulmonary resuscitation.

Step 1.2: A vital sign state of the monitored object is determined according to the medical data of the monitored object.

The medical data of the monitored object can reflect the vital sign state of the monitored object, and is analyzed after being obtained, so as to determine the vital sign state of the monitored object.

Specifically, the medical data obtained may comprise one item or a plurality of items. One item of medical data may be considered as one type of medical data. After each item of medical data meets a predetermined trigger condition (the trigger condition is associated with the vital sign state), it can be determined that the vital sign state of the monitored object is specifically the vital sign state corresponding to the trigger condition.

If there is one item of medical data, the vital sign state determined from this item of medical data is a final vital sign state of the monitored object. If there are a plurality of items of medical data, the plurality of items of vital sign states are comprehensively evaluated according to judgment rules in the medical field, so as to determine the final vital sign state of the monitored object. In a specific implementation, judgment rules for vital sign states may be configured in the medical device. The judgment rules can not only specify an item of or items of medical data required for the identification of a vital sign state, but also specify a final vital sign state corresponding to each permutation and combination result after permutation and combination of the vital sign states of the medical data.

For ease of description, the final vital sign state determined above may also be referred to as a target vital sign state. The target vital sign state is also the vital sign state that needs to be determined in this step.

In practical applications, in a specific application scenario, three items of physiological data of a monitored object are obtained, including respiration rate, blood pressure, and mental state. Respiration corresponds to three vital sign states: excessively low respiration rate, normal respiration rate, and excessively high respiration rate. The three vital sign states correspond to their respective trigger conditions, and a vital sign state of the respiration rate of the monitored object is determined according to a trigger condition a requirement for which is met by the obtained respiration rate. Similarly, the blood pressure and the mental state also correspond to their respective vital sign states, and the vital sign states corresponding to the blood pressure and the mental state are respectively determined according to the trigger conditions reached by their respective physiological data.

Assuming that the respiration rate of the monitored object is reduced to a particular degree, the systolic blood pressure is higher than a particular degree, and the mental state has changed significantly, it can be determined that the vital sign state of the monitored object is suspected sepsis.

During specific implementation, a monitoring scenario selected by a user for the monitored object is obtained, wherein the monitoring scenario is associated with one or more vital sign states; and the current medical data of the monitored object is obtained, and one vital sign state is determined, based on the medical data, from the vital sign states associated with the monitoring scenario as the current vital sign state of the monitored object.

More specifically, the medical device may provide several alternative monitoring scenarios, and the user such as medical staff may select a monitoring scenario corresponding to the current monitoring requirement of the monitored object based on the monitoring requirement. Several common monitoring scenarios are, for example, day surgery, night surgery, neonatal monitoring, and evaluation of a health status of a patient during a recovery period.

The monitoring scenarios are associated with judgment rules for medical data. After a monitoring scenario is selected, the medical data can be determined by using judgment rules associated with the monitoring scenario. The vital sign state associated with the monitoring scenario indicates a possible vital sign state of the monitored object in a monitoring scenario. For example, in a newborn monitoring scenario, the newborn's vital sign state may comprise: a neonatal intensive care state, a neonatal sub-intensive care state, and a neonatal general care state. For another example, in a day surgery monitoring scenario, the vital sign state of the monitored object may comprise a surgical induction stage, a surgical maintenance stage, and a surgical recovery stage. It should be noted that, depending on actual monitoring requirements, the monitoring scenarios are configured with corresponding associated vital sign states.

It should be noted that the judgment rules associated with the monitoring scenarios specify a type of medical data required to determine the vital sign state. Therefore, the corresponding type of medical data of the monitored object may be obtained according to the judgment rules associated with the monitoring scenario.

Different vital sign states correspond to different trigger conditions. After the medical data of the monitored object is obtained, a trigger condition a requirement for which is met by the medical data is determined, and then it can be determined that the vital sign state of the monitored object is a vital sign state corresponding to the trigger condition.

Step 1.3: The target working mode is determined according to the vital sign state.

A working mode library may be preset for the medical device, and the preset working mode library comprises a plurality of working modes, a correspondence being provided between a working mode and a vital sign state.

The vital sign state and the working mode may be in a one-to-one correspondence, that is, different vital sign states correspond to different working modes. Alternatively, the vital sign state and the working mode may be in a many-to-one correspondence, that is, different vital sign states may correspond to the same working mode. In other words, the medical device may use the same mode for different vital sign states of the monitored object.

After the vital sign state of the monitored object is determined in step 1.2, the working mode corresponding to the vital sign state can be determined in the preset working mode library. For ease of description, the determined working mode may be referred to as the target working mode.

Still in the above example, it assumed that the vital sign state determined in step 1.2 is a cardiac arrest state. It can be understood that the patient in a cardiac arrest state requires a cardiopulmonary resuscitation operation. Therefore, in the preset working mode library, a working mode corresponding to the cardiac arrest state is a working mode related to the cardiopulmonary resuscitation operation, and the working mode can be determined as the target working mode according to the correspondence. The medical device executes the target working mode, and can assist the medical staff to perform the cardiopulmonary resuscitation operation on the monitored object.

Step 1.4: The target working mode is executed.

The working mode is a general description of the working content of the medical device.

In a specific implementation, the working mode may limit the content of interface display and workflow of the medical device. Specifically, the working mode may comprise at least one of display interface layout configuration information of the medical device and workflow configuration information of the medical device.

The display interface layout configuration information is used to indicate parameter items included in an interface to be displayed during the working process of the medical device, and the layout of these parameter items. The workflow configuration information is used to indicate steps included in the working process of the medical device, and the order in which these steps are performed.

The medical device executes the target working mode to implement monitoring of the monitored object. The monitoring comprises how the device display interface is displayed and how the workflow is executed.

In another specific implementation, the working mode may comprise a workflow set, a tool set associated with the workflow set, and constraint conditions for executing workflows in the workflow set.

To facilitate the understanding of the execution of the working mode, the concepts of the workflow set, workflow, tool set, and tool are first explained.

The workflow set is a set of workflows. It should be noted that the workflow set may comprise one or more workflows. The tool set is a set of application tools. It should be noted that the tool set associated with a tool flow set may comprise one or more application tools.

The workflow is a basic procedure for implementing one function of the medical device, such as an induction procedure before the operation, a maintenance procedure during the operation, and a resuscitation procedure after the operation is completed. Some tools may be used during the execution of the workflow, and these tools are the above application tools. Specifically, the application tool is a module that may be used during execution of a workflow of a medical device to implement a specific function. For example, the application tool comprises an apnea analysis module, a sign parameter value distribution statistics module, a critical congenital heart disease screening module, etc.

The workflow and the application tool both may be considered as functional modules, and both are generally implemented through software programs. The difference lies in that the execution of the application tool depends on the execution of the workflow, that is, one or more application tools may be called during execution of a workflow, so as to load functions implemented by the application tools. One application tool may be called by a plurality of workflows, and one workflow may also call a plurality of application tools. The two are in a many-to-many correspondence.

It should be noted that the workflows in the workflow set and the application tools in the tool set may be pre-stored in a data pool. The data pool may specifically comprise a workflow pool and a tool pool. The workflow pool contains all the workflows that may be used by the medical device, and the tool pool contains all the application tools that may be used by the medical device.

There are constraint conditions for the execution of the workflows in the workflow set. Such constraint conditions may comprise constraint conditions between the workflows, and may also comprise constraint relationships between the workflows and the application tools. The constraint conditions between the workflows may be embodied as constraint conditions for the execution sequence of the workflows. The constraint relationships between the workflows and the application tools may be embodied as the relationships of the calling of the application tools by the workflows.

The target working mode is one of the working modes in the above form, and therefore the target working mode may also be expressed in the above form. Based on the target working mode in this form, the specific manner of executing the target working mode is:

executing the workflows in sequence according to the constraint conditions for executing the workflows in the workflow set, and calling tools associated with the workflows in a process of executing the workflows.

It should be noted that the medical device can continuously work, and if it is determined according to medical data that the vital sign state of the monitored object has changed, the medical device can automatically switch the working module to a working mode corresponding to the changed vital sign state. The switching of the working module may be visually reflected in changes in the display interface, such as changes in layout of monitored parameters, changes in monitored parameter types, and changes in the number of the monitored parameters.

It can be learned from the above technical solutions that the present application provides a multi-working mode setting method for a medical device. In this method, medical data of a monitored object can be obtained, a vital sign state of the monitored object can be determined according to the medical data, and a working mode corresponding to the vital sign state is selected in a preset working mode library and executed, to implement monitoring of the monitored object by the medical device. Compared with the manner of manual combination of working modes, the manner provided in the present application can improve the efficiency of setting the working mode of the medical device, and automatically set the working mode.

To facilitate the understanding of the technical solutions of the present application, the following application scenarios are provided for description.

In an application scenario, the medical device obtains identity information of a patient from a wristband worn by the patient, wherein the identity information comprises age; and the medical device can determine according to the age that the patient's vital sign state is an adult, and then the medical device starts an adult monitoring mode.

In another application scenario, medical data obtained by the medical device contains the patient's medical history data or diagnosis results; after analysis on the medical history data or the diagnosis result data, it is determined that the patient's heart is abnormal, and a working mode related to the heart state is started, wherein the working mode has an arrhythmia analysis function. Alternatively, after the medical device analyzes the medical history data or the diagnosis result data and determines that the patient's blood pressure may be abnormal, a working mode related to the blood pressure state is started; in this working mode, 24-hour ambulatory blood pressure monitoring can be performed, and statistics collection can also be performed on the overall situation of the patient's day or night blood pressure.

In still another application scenario, the medical device can obtain the patient's physiological data, treatment data, nursing data, and other medical data from an electronic medical record system or other clinical systems (such as a medical order system and a nursing order system). The physiological data comprises biochemical test data, rescue cardiopulmonary resuscitation data, etc.; the treatment data comprises mechanical ventilation with a ventilator, medication use, a doctor's order, etc.; and the nursing data comprises nursing activities such as sputum suction, patient cleaning, turning over, and feeding. The medical device enters a working mode suitable for the patient with reference to the vital sign monitored data. For example, if it is determined according to the vital sign monitored data and the biochemical examination results that the patient has a sepsis problem, a sepsis treatment mode is started. For another example, if it is determined according to treatment data that the patient is receiving mechanical ventilation treatment with a ventilator, the medical device starts an auxiliary ventilation monitoring mode.

Figure 2:
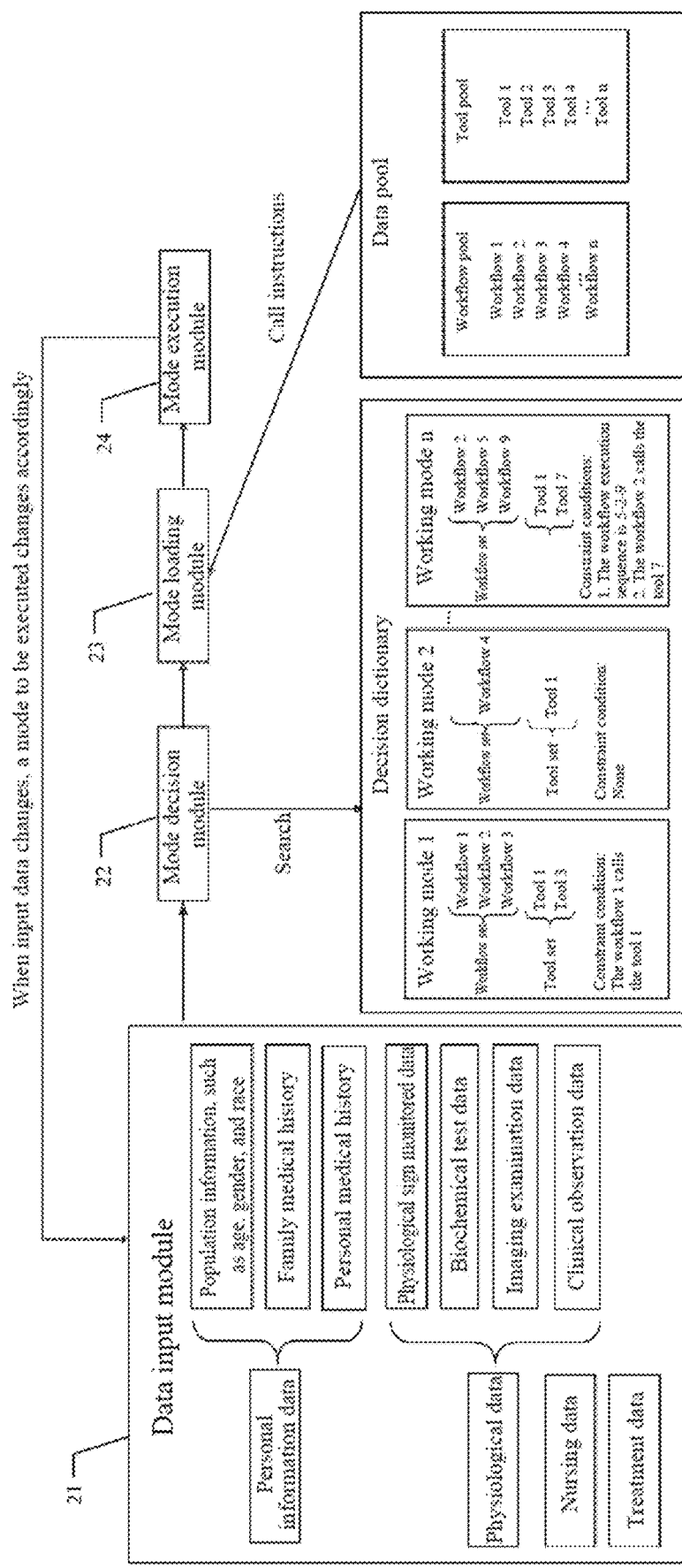

The present application provides another implementation of a multi-working mode setting method for a medical device. As shown in FIG. 2, the implementation comprises a data input module 21, a mode decision module 22, a mode loading module 23, and a mode execution module 24.

The data input module 21 obtains medical data of a monitored object.

As shown in FIG. 2, the medical data may specifically comprise: personal information data, physiological data, nursing data, and treatment data. The personal information data comprises population information (such as age, gender, and race), family medical history, personal medical history, etc., and the physiological data comprises vital sign monitored data, biochemical test data, imaging examination data, clinical observation data, etc.

The mode decision module 22 selects a working mode in a decision dictionary according to the medical data.

It should be noted that for the specific selection manner, reference may be made to the description in step 1.2 and step 1.3 in the above embodiment, and details are not repeated herein. In this embodiment, the decision dictionary may be considered as a specific implementation of the above preset working mode library. As shown in FIG. 2, the decision dictionary comprises several working modes, and the working modes may be specifically represented by three parts: a workflow set, a tool set, and constraint conditions.

The constraint conditions may comprise constraints on the execution order of workflows. As shown in FIG. 2, in a constraint condition for a working mode n, the workflow set comprises a workflow 2, a workflow 5, and a workflow 9, and the execution order is the workflow 5, a workflow 3, and the workflow 9. The constraint condition may also comprise application tools associated with the workflows. As shown in FIG. 2, in the constraint condition of the working mode n, the workflow 2 calls a tool 7; and for another example, in a constraint condition for a working mode 1, a workflow 1 calls a tool 1. The constraint condition may be empty. As shown in FIG. 2, the constraint condition for the working mode 2 is none.

The workflows in the workflow set and the application tools in the tool set may be pre-stored in a data pool. A workflow pool in the data pool comprises n workflows. In order to distinguish and record, digital serial number identifiers may be added to the workflows, that is, the workflows are denoted as a workflow 1, a workflow 2, a workflow 3, . . . , a workflow n. A tool pool in the data pool comprises n tools. In order to distinguish and record, digital serial number identifiers may be added to the application tools, that is, the application tools are denoted as a tool 1, a tool 2, a tool 3, . . . , a tool n.

The mode loading module 23 calls a related workflow and application tool from the data pool according to the working mode selected by the mode decision module 22.

The mode execution module 24 executes the workflow called by the mode loading module 23, and calls the application tool associated with the workflow during the execution of the workflow. It should be noted that the execution process needs to follow the constraint conditions.

In the process of continuous work, if the mode decision module 22 determines according to the medical data obtained by the data input module 21 that the vital sign state of the monitored object has changed, the mode execution module 24 may automatically switch the working module to a working mode corresponding to the changed vital sign state.

With respect to the medical device with the above structure, a few explanations are added. First, the mode decision module and the mode loading module may be present inside the medical device, or may be present outside the medical device, for example, provided on a web server or a cloud server. Second, the working mode in the decision dictionary can be edited, added, deleted, and subjected to other processing operations. For example, a new working mode can be generated by self-learning. For another example, an external processing instruction for the working mode may be received, and a processing operation is performed on the working mode according to the processing instruction. Third, the workflow and application tools in the data pool may also be subjected to the above processing operations.

The following uses several specific application scenarios to describe the implementation of the technical solution with examples.

Application Scenario 1

Figure 3A:
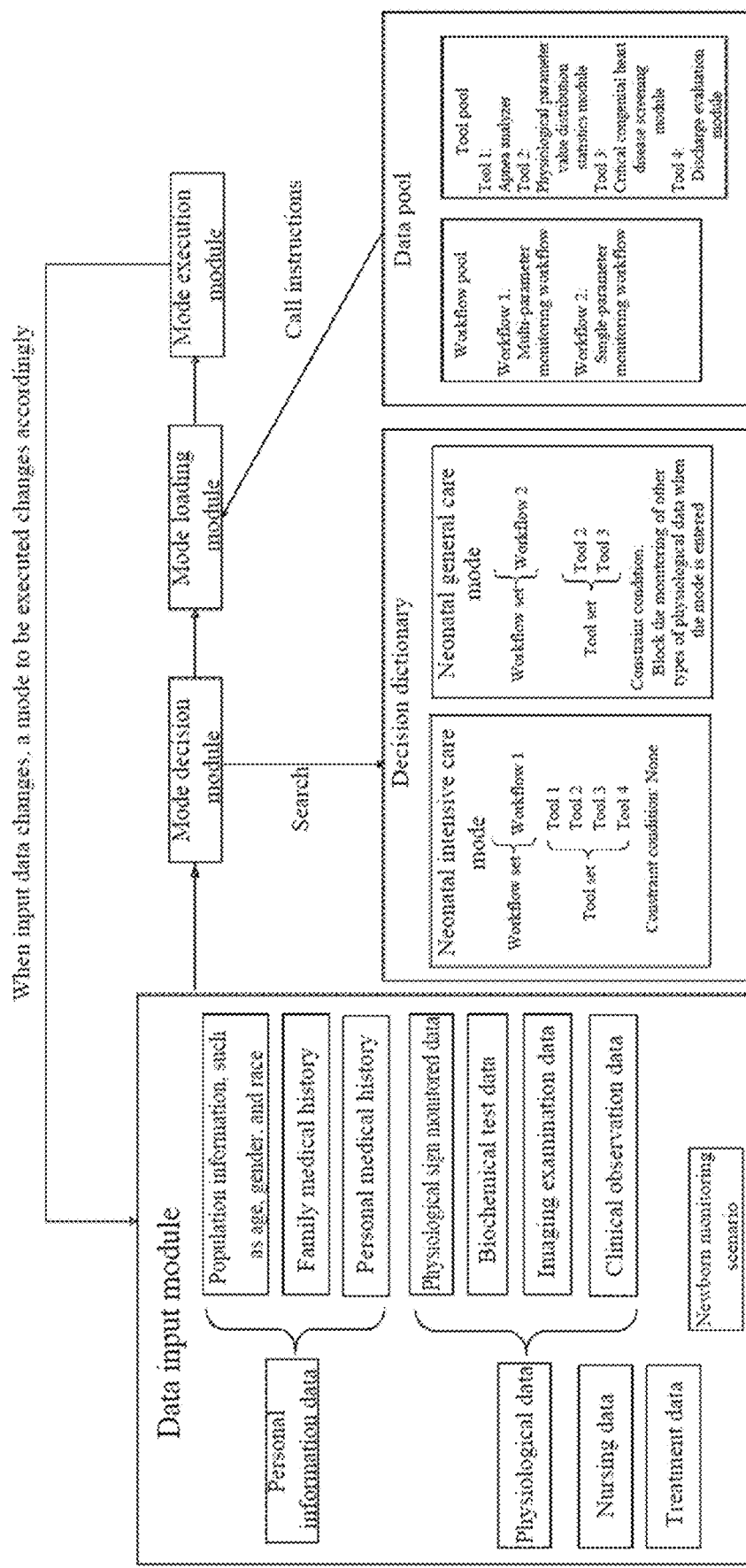
FIGS. 3A and 3B are flowcharts of two specific application scenario examples.

As shown in FIG. 3A, assuming that the monitored object is a newborn, medical staff can first select a newborn monitoring scenario on the medical device according to characteristics of the monitored object.

The newborn monitoring scenario is set in advance, and setting information indicates types of medical data that need to be acquired to determine the newborn's vital sign state. Therefore, according to the setting information of the newborn monitoring scenario, the medical device can acquire a corresponding type of medical data of the newborn, and determine the vital sign state according to the specific content of the medical data.

There are two vital sign states associated with the newborn monitoring scenario, namely a neonatal intensive care state and a neonatal general care state. With respect to the newborn monitoring scenario, the preset working mode library contains two working modes corresponding to the monitoring scenario, as shown in FIG. 3A, which are: a neonatal intensive care mode and a neonatal general care mode. The neonatal intensive care mode corresponds to the neonatal intensive care state, and the neonatal general care mode corresponds to the neonatal general care state.

In the intensive care state, there are a plurality of types of medical data that need to be monitored in the intensive care mode, such as electrocardiogram, blood oxygen, respiration, and blood pressure. Therefore, the intensive care mode may also be referred to as a multi-parameter monitoring mode. By comparison, in the general care state, the general care mode requires fewer types of medical data to be monitored, and usually comprises only blood oxygen. Therefore, the general care mode may also be referred to as a single-parameter monitoring mode.

The specific forms of the neonatal intensive care mode and the neonatal general care mode may be expressed as comprising three parts: a workflow set, a tool set associated with the workflow set, and constraint conditions required for the execution of the workflows.

Specifically, as shown in FIG. 3A, in the neonatal intensive care mode, the workflow set specifically comprises one workflow, namely a multi-parameter monitoring workflow; the tool set associated with this workflow set comprises four items: an apnea analyzer, a physiological parameter value distribution statistics module, a critical congenital heart disease screening module, and a discharge evaluation module; and constraint conditions required for workflow execution are none.

In the neonatal general care mode, the workflow set specifically comprises one workflow, namely a single-parameter monitoring workflow; the tool set associated with this workflow set comprises two items: a physiological parameter value distribution statistics module and a critical congenital heart disease screening module; and constraint conditions required for workflow execution are to block the monitoring of other types of medical data when entering the mode.

The workflows in the workflow set and the application tools in the tool set may be pre-stored in a data pool. As shown in FIG. 3A, the workflow pool in the data pool contains two workflows, which are: a multi-parameter monitoring workflow and a single-parameter monitoring workflow. The multi-parameter monitoring workflow is denoted as a workflow 1, and the parameter monitoring workflow is denoted as a workflow 2. The tool pool in the data pool contains four application tools, which are: an apnea analyzer, a physiological parameter value distribution statistics module, a critical congenital heart disease screening module, and a discharge evaluation module. The four application tools are denoted as a tool 1, a tool 2, a tool 3, and a tool 4.

The above is a description of some preset information about the newborn monitoring mode.

Based on the above setting information, in practical applications, the data input module obtains the newborn's medical data; the mode decision module determines the newborn's vital sign state according to the medical data, and then determines, from the above two working modes, a target working mode corresponding to the vital sign state; the mode loading module loads, from the data pool, a workflow and application tools required for the target working mode; and the mode execution module executes the target working mode.

It should be noted that the medical device can continuously work, and if it is determined according to the acquired medical data that the newborn's vital sign state has changed, the medical device can automatically switch to a target working mode corresponding to the changed vital sign state.

Specifically, when it is determined that the vital sign state of the monitored object has changed from the neonatal intensive care state to the neonatal general care state, it is determined that the target working mode is to be switched from the neonatal intensive care mode to the neonatal general care mode; otherwise, the target working mode is to be switched from the neonatal general care mode to the neonatal intensive care mode.

After the working mode is switched, the display interface of the medical device changes accordingly. If the newborn's condition is serious and the medical device determines that the intensive care mode needs to be executed for the newborn, the display interface comprises measurement data of a plurality of monitored parameters such as electrocardiogram, blood oxygen, respiration, and blood pressure. The measurement data comprises measured values and an oscillogram. If the newborn's condition improves and the medical device determines that only the general care mode needs to be executed, the display interface no longer contains monitored data of some parameters such as electrocardiogram, respiration, and blood pressure, and provides only relevant monitored data of blood oxygen. With the change of the newborn's vital sign state, it can be seen that the display interface of the medical device has changed accordingly.

In the above application scenario, the two vital sign states of the newborn are taken as an example; and in other application scenarios, the same is true for changes of the other two vital sign states of another monitored object.

For example, the vital sign state of the monitored object comprises a condition monitoring state and a condition recovery state, and the working mode of the medical device comprises a condition monitoring mode corresponding to the condition monitoring state and a condition recovery mode corresponding to the condition recovery state; and when it is determined that the vital sign state of the monitored object has changed from the condition monitoring state to the condition recovery state, the target working mode is to be switched from the condition monitoring mode to the condition recovery mode.

The condition monitoring state and the condition recovery state are two relative vital sign states, and the two vital sign states can change from or to each other. If the condition of the monitored object is aggravated, the vital sign state will be changed from the condition monitoring state to the condition recovery state, and vice versa.

Specific functions of the working mode are set according to the vital sign state of the monitored object. In the condition monitoring state, clinical attention is paid to abnormal conditions of some physiological parameters, so the specific functions of the working mode may comprise real-time monitoring of physiological parameters, trend review of the physiological parameters, review of alarm events, etc. In the patient condition recovery state, more clinical attention is paid to the overall recovery condition of the monitored object. Therefore, the specific functions of the working mode may comprise condition evaluation, wherein the condition evaluation process will block some unimportant physiological alarms.

Application Scenario 2

Assuming that the monitored object is a patient who needs surgery, monitoring scenario options provided by the medical device may comprise a surgery scenario, and medical staff can select the surgery scenario according to characteristics of the patient.

Figure 3B:
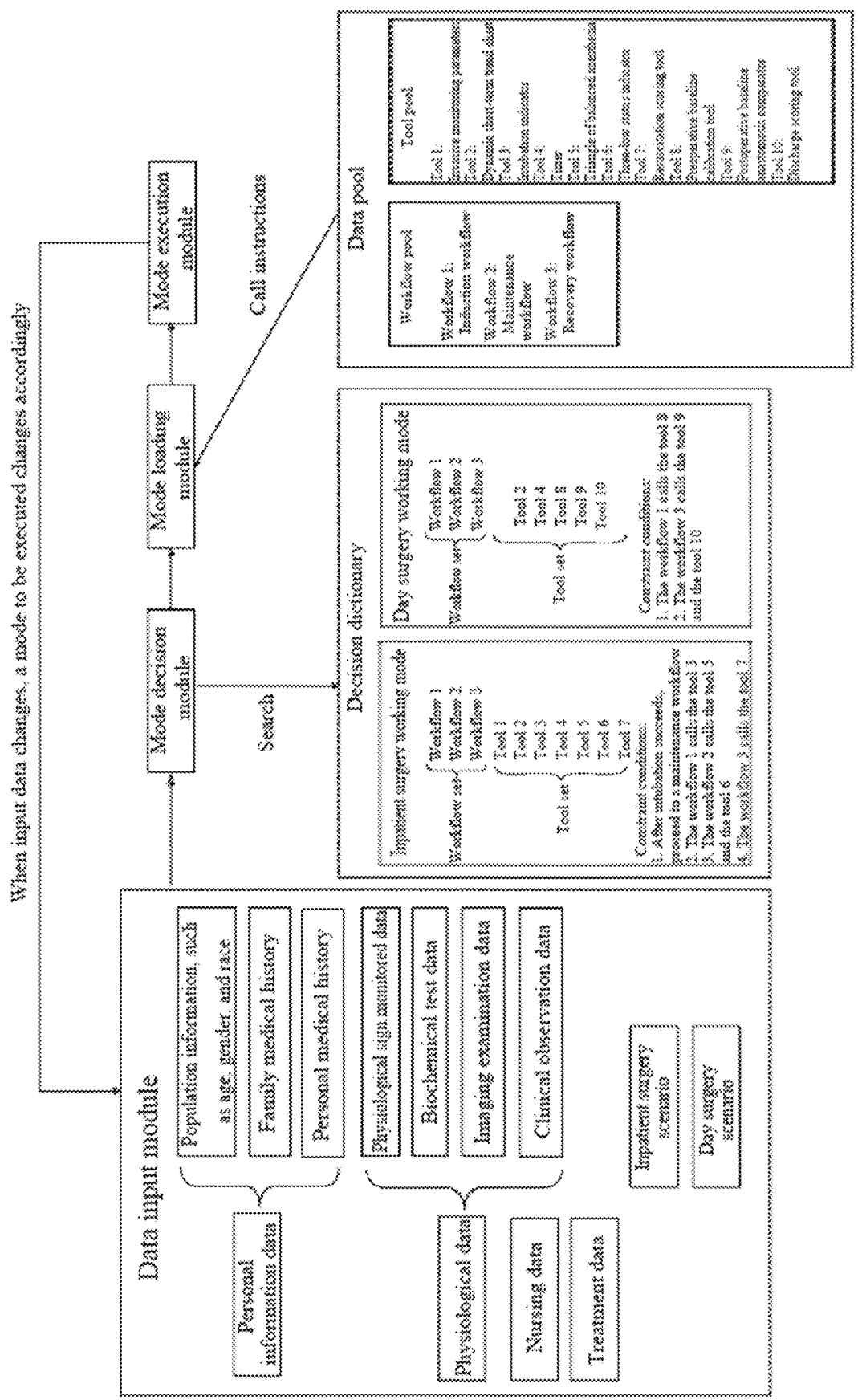

More specifically, as shown in FIG. 3B, the surgery scenario may be more specifically divided into an inpatient surgery scenario and a day surgery scenario. Patients after inpatient surgery are often sent to an intensive care unit, and patients after day surgery may often be discharged after observation. Compared with the day surgery, the inpatient surgery is often a major operation, with longer operation time, many monitored parameters and often accompanied by invasive monitoring, such as invasive blood pressure monitoring. An anesthesia manner is mainly a combination of inhalation and intravenous anesthesia. There is rarely single intravenous injection. The day surgery is often a minor operation with a short duration, and monitored parameters are mostly obtained by non-invasive monitoring; an anesthesia manner is mainly intravenous injection, and inhalation anesthesia is rarely used.

It can be understood that a workflow set, a tool set, and constraint conditions in a working mode are correspondingly set according to the characteristics of the surgery scenario. Therefore, in different surgery scenarios, working modes executed by the medical device will be different. For example, in the working mode corresponding to the inpatient surgery scenario, there are more surgical monitored parameters, longer monitoring time in the induction stage, and more parameters monitored in the maintenance stage. In the working mode corresponding to the inpatient surgery, it is required to determine whether the patient's resuscitation state meets requirements for transfer to the intensive care unit, while in the working mode corresponding to the day surgery, it is determined whether the patient's resuscitation state meets requirements for discharge.

In addition, the specific forms of the working mode may be expressed as a workflow set, a tool set associated with the workflow set, and constraint conditions required for the execution of the workflows, and the difference between working modes may be reflected in the difference in the above three aspects.

As shown in FIG. 3B, in the working mode corresponding to the inpatient surgery scenario, the tool set comprises: invasive monitored parameters, a dynamic short-term trend chart, an intubation indicator, a timer, a triangle of balanced anesthesia, a three-low status indicator, and a resuscitation scoring tool. However, in the working mode corresponding to the day surgery scenario, the tool set comprises different application tools, which are: a dynamic short-term trend chart, a timer, a preoperative baseline calibration tool, a postoperative baseline anastomosis comparator, and a discharge scoring tool. Moreover, because tools associated with the workflow are different, constraint conditions for the execution of the workflow are also different. It should be noted that the workflows included in the workflow set and the application tools associated with the tool set can all be stored in the data pool, and the specific content of the data pool is shown in FIG. 3B.

Therefore, if the medical device provides a more detailed classification of surgery scenarios, the medical staff can select a specific surgery scenario according to the characteristics of the surgery patient.

The surgery scenario is set in advance, and the setting information indicates types of medical data that need to be acquired to determine the patient's vital sign state. Therefore, according to the setting information of the surgery scenario, the medical device can collect the corresponding type of medical data of the patient, and determine the vital sign state according to the value of the medical data.

Regardless of an inpatient surgery or a day surgery, the monitoring scenarios are associated with three vital sign states, which are: a surgical induction state, a surgical maintenance state, and a surgical recovery state. With respect to the surgery scenario, the preset working mode library contains three working modes corresponding to the monitoring scenario, which are: a surgical induction mode, a surgical maintenance mode, and a surgical recovery mode. The surgical induction mode corresponds to the surgical induction state, the surgical maintenance mode corresponds to the surgical maintenance state, and the surgical recovery state corresponds to the surgical recovery mode.

The surgical induction state is the state of the patient during the preparation for the surgery. The surgical preparation comprises injecting an anesthetic to the patient, and further comprises inserting a catheter needed for the surgery into the patient, etc. After the anesthetic is injected, it is checked whether the patient's respiration rate meets a particular requirement. If yes, it indicates that the patient has entered the surgical induction state.

When the patient's respiration rate reaches another requirement, such as a stable respiratory waveform, it indicates that the anesthetic for the patient is working and the surgery can be performed. At this time, the patient is in the surgical maintenance state. After the surgery is completed, if acquired sign parameters can indicate that the patient has regained consciousness, it means that the patient has entered the surgical recovery state.

The above is a description of some preset information about the surgical monitoring mode.

Based on the above setting information, in practical applications, the data input module obtains the patient's medical data; the mode decision module determines the patient's vital sign state according to the medical data, and then determines, from the above three working modes, a target working mode corresponding to the vital sign state; the mode loading module loads, from the data pool, a workflow and application tools required for the target working mode; and the mode execution module executes the target working mode.

During the continuous monitoring of the patient by the medical device, if it is determined according to the acquired medical data that the patient's vital sign state has changed, the medical device can automatically switch to a target working mode corresponding to the changed vital sign state.

When it is determined that the vital sign state of the monitored object is the surgical induction state, it is determined that the target working mode is set at the surgical induction mode. When it is determined that the vital sign state of the monitored object has changed from the surgical induction state to the surgical maintenance state, it is determined that the target working mode is to be switched from the surgical induction mode to the surgical maintenance mode; and when it is determined that the vital sign state of the monitored object has changed from the surgical maintenance state to the surgical recovery state, it is determined that the target working mode is to be switched from the surgical maintenance mode to the surgical recovery mode.

Different surgical working modes comprise different display interface layout configuration information and different workflow configuration information. Specifically, the surgical induction mode comprises display interface layout configuration information and workflow configuration information related to the medical device during a surgical induction stage; the surgical maintenance working mode comprises display interface layout configuration information and workflow configuration information related to the medical device during a surgical maintenance stage; and the surgical recovery working mode comprises display interface layout configuration information and workflow configuration information related to the medical device during a surgical recovery stage.

The display interface layout configuration information is used to indicate the display interface layout; and the workflow configuration information is used to indicate the steps included in the workflow and the execution order of the steps. As the patient undergoes changes in the above three vital sign states, the content of the display interface of the medical device also changes visually according to different display interface layout configuration information.

For example, in an inpatient surgery monitoring scenario, when a patient enters a surgical induction state, the medical device will execute a surgical induction mode, such that the display interface comprises an intubation indicator to prompt medical staff to perform an intubation operation on the patient. When the patient changes from the surgical induction state to the surgical maintenance state, the medical device will execute the surgical maintenance working mode, and changes of the display interface comprise the removal of the intubation indicator, and the addition of the triangle of balanced anesthesia and the three-low status indicator. When the patient changes from the surgical maintenance state to the surgical recovery state, the medical device will execute the surgical recovery working mode, and changes of the display interface comprise the removal of the triangle of balanced anesthesia and the three-low status indicator, and the addition of the resuscitation scoring tool.

For another example, in a day surgery monitoring scenario, when the patient enters the surgical induction state, the display interface of the medical device will contain the preoperative baseline calibration tool; when the patient changes from the surgical induction state to the surgical maintenance state, changes of the display interface comprise the removal of the preoperative baseline calibration tool; and when the patient changes from the surgical maintenance state to the surgical recovery state, changes of the display interface comprise the addition of the postoperative baseline anastomosis comparator and the discharge scoring tool.

It can be learned that as the patient's vital sign state changes, the medical device automatically switches the corresponding working mode, which improves the working efficiency of the medical device. With the switching of the working mode, a user can visually view the changes of the display interface.

It should be noted that, as shown in FIG. 3B, the three specific working modes may be included as workflows in two larger monitoring scenarios, which are the inpatient surgery and the day surgery. After the medical device determines one of the two monitoring scenarios for use, the medical device can execute the working mode corresponding to the monitoring scenario, and during the execution of the working mode, the medical device switches between three different workflows according to changes in the patient's vital sign state.

The present application further provides a multi-working mode setting method for a medical device, and the method can be used to execute a corresponding working mode according to a setting instruction entered by a user.

Figure 4:
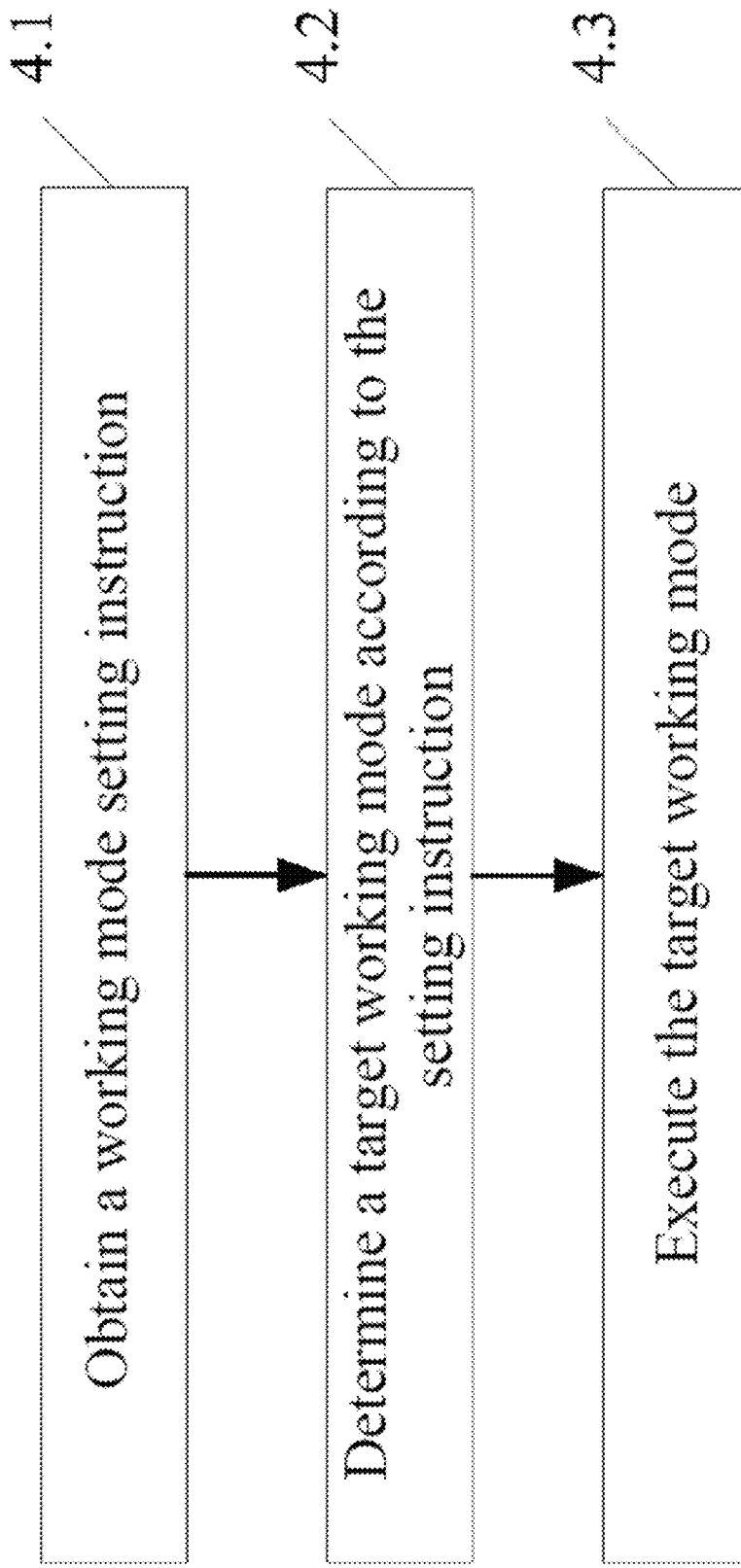
FIGS. 4 to 6 are three other flowcharts of a multi-working mode setting method for a medical device.

FIG. 4 shows a procedure of the multi-working mode setting method for a medical device, which specifically comprises step 4.1 to step 4.3.

Step 4.1: A working mode setting instruction is obtained.

The medical device may provide an input module, and a user may enter the working mode setting instruction via the input module.

For example, if a display of the medical device is set to a touch screen, the display can provide alternative options for working modes included in a preset working mode library, for the user to select. In response to the user's operation of selecting a working mode, the medical device generates a setting instruction for the working mode.

Step 4.2: A target working mode is determined according to the setting instruction.

Specifically, the preset working mode library contains a plurality of working modes, and the setting instruction may specify the working mode selected by the user. Therefore, the working mode corresponding to the setting instruction is determined from the preset working mode library according to the setting instruction, and the determined working mode may be referred to as the target working mode.

In addition, the working mode comprises at least one of display interface layout configuration information of the medical device and workflow configuration information of the medical device.

Step 4.3: The target working mode is executed.

The working mode comprises a workflow set, a tool set associated with the workflow set, and constraint conditions for executing workflows in the workflow set. Based on this, a manner of execution of the target working mode comprises executing the workflows in sequence according to the constraint conditions for executing the workflows in the workflow set of the target working mode, and calling tools associated with the workflows in a process of executing the workflows.

It should be noted that, for the description of this embodiment, reference may be made to the above related content, and details are not repeated herein.

The present application further provides a multi-working mode setting method for a medical device. In this method, the medical device is connected to other medical devices, and can set its own working mode according to parameter setting information of the other medical devices.

Figure 5:
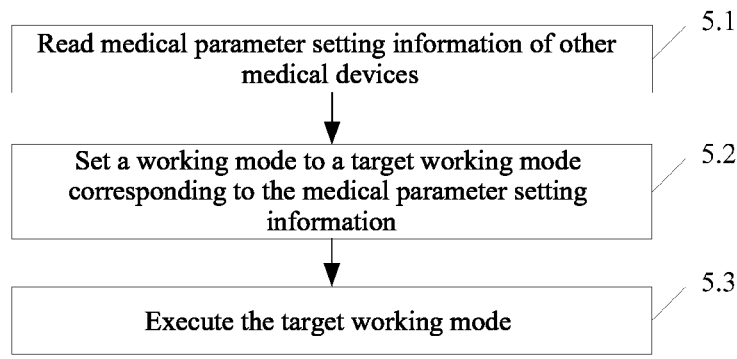

FIG. 5 shows a procedure of the multi-working mode setting method for a medical device, which specifically comprises step 5.1 to step 5.3.

Step 5.1: Medical parameter setting information of other medical devices is read.

For ease of differentiation, the medical device to which this method is applied may be referred to as a target medical device. Clinically, the monitored object may be further connected to other medical devices, and the other medical devices may comprise a medical system. It should be noted that there may be other medical devices connected to the monitored object.

Specifically, the other medical devices may comprise any one or more of a measurement device, a monitoring device, and a treatment device. The treatment device includes, but is not limited to, one or more of an extracorporeal circulation machine, a ventilator, an anesthesia machine, and a defibrillator.

The other medical devices can perform functions such as measurement, monitoring, and treatment on the monitored object. For example, during a surgery, if the patient's cardiac function is temporarily and passively interrupted, the extracorporeal circulation machine is required to provide cardiac-related functional support. For another example, the defibrillator can perform defibrillation operations on a patient with an abnormal heart rate, such that the patient's heart rate returns to normal.

The other medical devices may contain medical parameter setting information. When the other medical devices are specifically treatment devices, the medical parameter setting information is specifically treatment parameter setting information.

The medical parameter setting information is used to indicate at least one of a medical manner and a medical purpose implemented by the other medical devices on the monitored object, etc. For example, the medical manner of the defibrillator may comprise three medical modes, which are a pacing mode, an automatic defibrillation mode, and a manual defibrillation mode.

A status of a medical means currently implemented by the other medical devices on the monitored object can be determined by reading the medical parameter setting information of the other medical devices connected to the target medical device.

Step 5.2: A working mode is set to a target working mode corresponding to the medical parameter setting information.

For different medical means provided by the medical device, working modes provided by the target medical device are also different. The three medical modes of the defibrillator are taken as an example. If the defibrillator is working in the pacing mode, a filtering module of the target medical device needs to be set to a mode corresponding to the cardiac pacing mode; if the defibrillator is working in the manual defibrillation mode, the filtering module of the target medical device needs to be set to a mode corresponding to the manual defibrillation mode; and if the defibrillator is working in the automatic defibrillation mode, the filtering module of the target medical device needs to be set to a mode corresponding to the automatic defibrillation mode.

The medical parameter setting information can reflect a status of the medical means, such that a correspondence between the medical parameter setting information and the working mode may be preset.

After the medical parameter setting information of the other medical devices is obtained, the target working mode can be determined according to the correspondence. The target working mode may be used to reflect a medical effect of medical parameters.

Step 5.3: The target working mode is executed.

It should be noted that, for the description of this embodiment, reference may be made to the above related content, and details are not repeated herein.

The present application further provides a multi-working mode setting method for a medical device, and the method can be used to directly set a working mode of the medical device according to acquired vital sign parameters.

Figure 6:
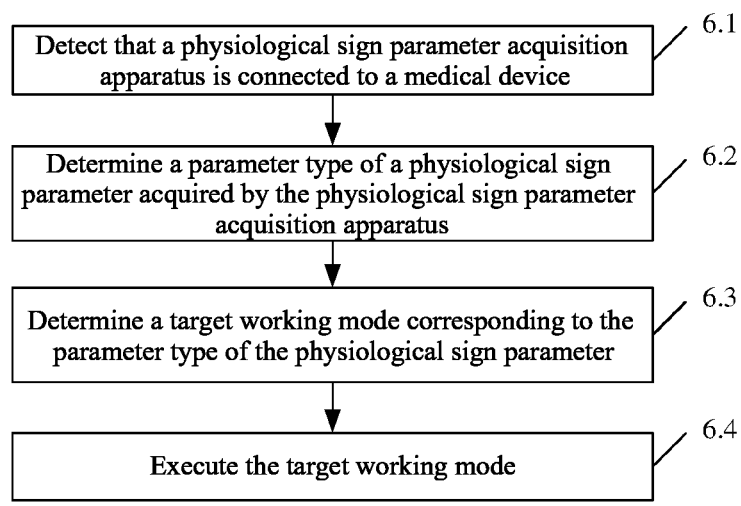

FIG. 6 shows a procedure of the multi-working mode setting method for a medical device, which specifically comprises step 6.1 to step 6.4.

Step 6.1: That a vital sign parameter acquisition apparatus is connected to the medical device is detected.

The medical device may be connected to a vital sign parameter acquisition apparatus, and the vital sign parameter acquisition apparatus may acquire real-time vital sign parameters of a monitored object. When the medical device detects a signal of connection to the vital sign parameter acquisition apparatus, it can be determined that the vital sign parameter acquisition apparatus is connected.

There may be one or more vital sign parameter acquisition apparatuses, and there may be one or more types of vital sign parameter acquisition apparatuses.

Step 6.2: A parameter type of a vital sign parameter acquired by the vital sign parameter acquisition apparatus is determined.

Different types of vital sign parameter acquisition apparatuses are configured to acquire different types of vital sign parameters. For example, a blood oxygen collector can acquire a blood oxygen value of the monitored object, and a blood pressure meter can acquire a blood pressure value of the monitored object. The type of the vital sign parameter acquired by the vital sign parameter acquisition apparatus can be determined according to the type of the connected vital sign parameter acquisition apparatus.

Step 6.3: A target working mode corresponding to the parameter type of the vital sign parameter is determined.

Different types of vital sign parameters may require the medical device to provide different types of working modes. For example, the signal of the medical device being connected to the blood oxygen collector indicates that blood oxygen of the monitored object needs to be measured, and a display interface related to blood oxygen measurement needs to appear on the medical device. Similarly, the signal of the medical device being connected to the blood pressure meter indicates that a display interface related to blood pressure measurement needs to appear on the medical device. For another example, if the medical device detects that the device itself has two blood oxygen measurement channels, the medical device displays a dual blood oxygen monitoring interface; and if the medical device detects that the device itself has two non-invasive blood pressure measurement channels, the medical device displays a dual-channel non-invasive blood pressure monitoring interface.

In practical applications, a correspondence between the parameter type of the vital sign parameter and the working mode may be preset. After the parameter type is determined in step 6.2, the working mode is determined according to the correspondence, and the determined working mode is the target working mode in this step. The target working mode comprises at least one of display interface layout configuration information of the medical device and workflow configuration information of the medical device.

A specific manner of determining the target working mode comprises at least one of automatically generating interface layout and alarm configuration matching the parameter type based on the parameter type of the determined vital sign parameter. In other words, if the parameter type of the vital sign parameter is different, at least one of the generated interface layout and alarm configuration may also be different.

Changes of the interface layout in the working mode are described with examples.

For example, if there is one vital sign parameter, the interface layout is a single-parameter interface layout, and in this interface layout, the vital sign parameter may be displayed in a large font; and if there are a plurality of vital sign parameters, the interface layout is a multi-parameter interface layout; in this interface layout, the vital sign parameters are displayed according to the layout, some vital sign parameters in the layout are displayed in a relatively prominent manner, and the remaining vital sign parameters are displayed in a relatively ordinary manner.

Changes of the alarm configuration in the working mode are described with reference to specific application scenarios.

For example, when a patient is undergoing a surgery, the medical device determines that a working mode that needs to be executed is the surgical maintenance working mode. In the surgical maintenance working mode, the medical device may detect alarm information.

Alarms may be divided into two types: a physiological alarm and a technical alarm. The physiological alarm is an alarm caused by abnormalities in detected vital sign parameters; and the technical alarm is an alarm caused by the interruption of a monitoring signal or the detection of an interference signal. For example, when the patient is undergoing a surgery, the patient is monitored using a monitor. Surgical operations may be performed using an electrotome. A signal related to the electrotome will interfere with the monitor, and the monitor will generate an alarm. This alarm is a technical alarm.

The existence of the technical alarm may cause an error in the physiological alarm. Therefore, if the medical device detects a technical alarm and the executed working mode contains a physiological alarm, related information, such as detection workflow information of the physiological alarm and interface display information of the physiological alarm, of the physiological alarm in this working mode may be deleted, such that the alarm configuration of the working mode automatically fits the current situation.

In the prior art, after a medical device is connected to a vital sign parameter acquisition apparatus, regardless of which type of vital sign parameter is acquired by a sensor, it is required to manually select vital sign parameters required in the interface layout. This is lacking in automation. Compared with the prior art, the method provided in this embodiment enables the medical device to automatically match at least one of the related interface layout and alarm configuration.

Step 6.4: The target working mode is executed.

It should be noted that, for the description of this embodiment, reference may be made to the above related content, and details are not repeated herein.

In addition to the steps provided in the above embodiment, the following may be further included: handling of the interruption of vital sign parameters in the working mode.

Specifically, a cause for signal interruption of a vital sign parameter is determined if the signal interruption of the vital sign parameter acquired by a vital sign parameter acquisition apparatus is detected; and at least one of a display interface and a workflow corresponding to the vital sign parameter acquired by the vital sign parameter acquisition apparatus is deleted in the target working mode if the cause for signal interrupt is a normal cause.

For example, when performing medical treatment on a patient, the medical staff may actively remove the blood oxygen collector connected to the patient's body. At this time, the medical device detects that the blood oxygen signal acquired by the blood oxygen collector is interrupted. However, the cause for the signal interruption is a normal cause, and the medical staff can enter a signal interruption cause instruction to prompt the medical device that the cause for the signal interrupt is a normal cause. The medical device may delete, in the target working mode, at least one of a display interface and a workflow corresponding to the blood oxygen parameter according to the cause instruction.

In addition, the present application provides a medical device, which can automatically switch between a plurality of working modes. Specifically, the medical device comprises: a memory and a processor.

a memory, which pre-stores a plurality of working modes, wherein the working mode comprises several workflows, tools associated with the workflows, and constraint relationships for executing the workflows; and a processor, which, if a working state of the medical device meets a switching condition, switches between the plurality of working modes, and when a switched working mode is executed, executes the workflows in sequence according to the constraint conditions for executing the workflows in the workflow set, and calls tools associated with the workflows in a process of executing the workflows.

Moreover, the present application provides another medical device, comprising: a memory and a processor.

The memory is configured to store program instructions; and the processor is configured to execute the program instructions to implement the steps of any of the above multi-working mode setting methods for a medical device.

Each of the above units or modules for performing the steps may be stored in one or more above memories, and the above embodiments are respectively used to implement the above monitor or monitoring system, wherein the functional modules comprise each instruction set used to perform the corresponding steps of the above method, and the above modules or programs (i.e., instruction sets) do not need to be time-bound as discrete software programs, processes, or modules. Therefore, sub-blocks of these modules may be combined or rearranged in various embodiments. Therefore, in some embodiments of the disclosure, the memory may store a subset of the above modules or data structures.

Figure 7:
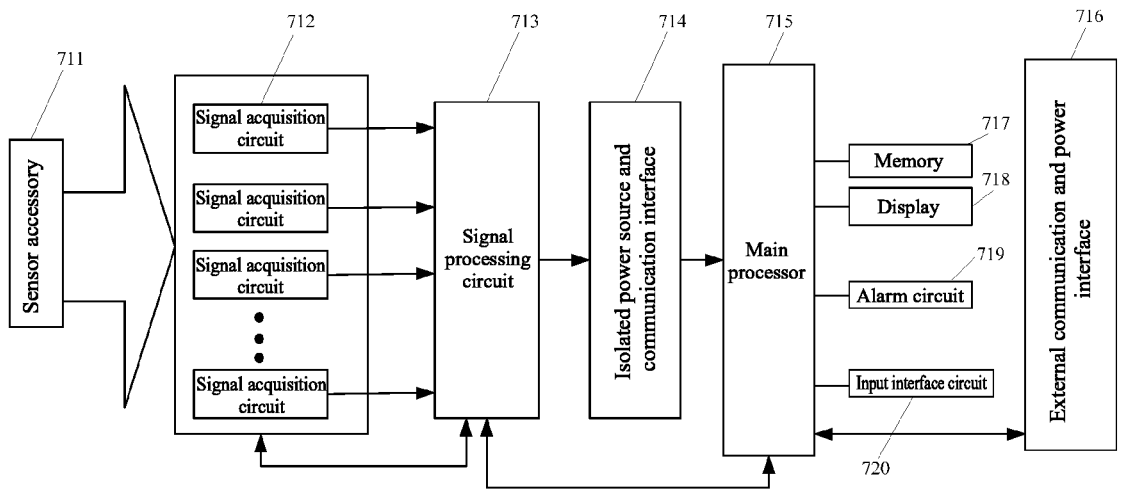
FIG. 7 is a schematic structural diagram of a monitor.

When the medical device is a monitor, a specific example of the monitor is shown in FIG. 7. FIG. 7 provides a system framework diagram of a parameter processing module in a multi-parameter monitor.

The multi-parameter monitor has an independent housing. A housing panel has a sensor interface zone in which a plurality of sensor interfaces are integrated for connecting with external vital sign parameter sensor accessories 711. The housing panel further comprises a small IXD display zone, a display 718, an input interface circuit 720, an alarm circuit 719 (such as an LED alarm zone), etc. The parameter processing module is used as an external communication and power interface for communicating with a main unit and taking power from the main unit. The parameter processing module also supports a build-out parameter module, can form a plug-in monitor main unit by means of inserting the parameter module, can be used as part of the monitor, or can be connected to the main unit via a cable, with the build-out parameter module being used as an external accessory of the monitor. In addition, the multi-parameter monitor comprises a memory 717 for storing computer programs and various data generated during the related monitoring process.

The internal circuit of the parameter processing module is disposed in the housing, as shown in FIG. 7, and comprises signal acquisition circuits 712 corresponding to at least two vital sign parameters, a front-end signal processing circuit 713, and a main processor 715.

The main processor 715 can implement the steps related to processing in each monitoring information display method described above.

The signal acquisition circuits 712 may be selected from an electrocardiogram circuit, a respiration circuit, a body temperature circuit, a blood oxygen circuit, a non-invasive blood pressure circuit, an invasive blood pressure circuit, etc. The signal acquisition circuits 712 are respectively electrically connected to the corresponding sensor interfaces and are used to be electrically connected to the sensor accessories 711 corresponding to different vital sign parameters, with an output end thereof being coupled to the front-end signal processor. A communication port of the front-end signal processor is coupled to the main processor, and the main processor is electrically connected to the external communication and power interface.

Various vital sign parameter measurement circuits can use common circuits in the prior art. The front-end signal processor completes sampling and analog-to-digital conversion of an output signal of the signal acquisition circuit, and outputs a control signal to control a measurement process of the vital signal. These parameters comprise but are not limited to: parameters such as electrocardiogram, respiration, body temperature, blood oxygen, non-invasive blood pressure, and invasive blood pressure.

The front-end signal processor can be implemented by a single-chip microcomputer or other semiconductor devices, and can also be implemented by an ASIC or an FPGA. The front-end signal processor can be powered by an isolated power source. The sampled data is simply processed and packaged, and then sent to the main processor through the isolated communication interface. For example, the front-end signal processor circuit can be coupled to the main processor 715 through an isolated power supply and communication interface 714.

The reason that the front-end signal processor is powered by an isolated power source is that the DC/DC power source isolated by a transformer plays a role in isolating the patient from a power supply device, and the main purpose is: 1. isolating the patient, and enabling an application part to be floating by means of an isolation transformer, so that a leakage current of the patient is small enough; and 2. preventing the voltage or energy during defibrillation or electrotome application from affecting a board card and a device of an intermediate circuit such as a main control board (guaranteed by a creepage distance and electrical clearance).

The main processor completes the calculation of vital sign parameters, and sends the calculation results and waveforms of the parameters to the main unit (such as a main unit with a display, a PC, and a central station) through the external communication and power interface. The external communication and power interface 716 may be one or a combination of local area network interfaces composed of Ethernet, a token ring, a token bus, and an optical fiber distributed data interface (FDDI) as the backbone of these three networks, may also be one or a combination of wireless interfaces such as infrared, Bluetooth, WiFi, and WMTS communication, or may also be one or a combination of wired data connection interfaces such as RS232 and USB.

The external communication and power interface 716 may also be one of a wireless data transmission interface and a wired data transmission interface or a combination thereof. The main unit may be any computer device such as the main unit of the monitor, an electrocardiogram ultrasonic diagnosis instrument, a computer, etc., and a monitoring device can be formed by means of installing with matching software. The main unit may further be a communication device such as a mobile phone, and the parameter processing module sends, by using a Bluetooth interface, data to the mobile phone supporting Bluetooth communication, so as to implement remote transmission of the data.

In addition, the present application provides a readable storage medium that stores a computer program. When the computer program is loaded and executed by a processor, any of the above multi-working mode setting method for a medical device is implemented.

The description has been made with reference to various exemplary embodiments herein. However, those skilled in the art would have appreciated that changes and modifications could have been made to the exemplary embodiments without departing from the scope herein. For example, various operation steps and components for performing operation steps may be implemented in different ways according to a specific application or considering any number of cost functions associated with the operation of the system (for example, one or more steps may be deleted, modified or incorporated into other steps).

The terms "first", "second", etc. in the specification and the claims herein as well as the above accompanying drawings are used to distinguish different objects, rather than to describe a specific order. In addition, the terms "comprising", "having", and any variations thereof are intended to cover non-exclusive inclusion. For example, a process, a method, a system, a product, or a device that comprises a series of steps or units is not limited to the listed steps or units, but optionally further comprises unlisted steps or units, or optionally further comprises other steps or units inherent in these processes, methods, or devices.

In addition, as understood by those skilled in the art, the principles herein may be reflected in a computer program product on a computer-readable storage medium that is pre-installed with computer-readable program codes. Any tangible, non-transitory computer-readable storage medium can be used, including magnetic storage devices (hard disks, floppy disks, etc.), optical storage devices (CD-ROM, DVD, Blu Ray disks, etc.), flash memories, and/or the like. These computer program instructions can be loaded onto a general-purpose computer, a dedicated computer, or other programmable data processing devices to form a machine, such that these instructions executed on a computer or other programmable data processing apparatus can generate an apparatus that implements a specified function. These computer program instructions can also be stored in a computer-readable memory that can instruct a computer or other programmable data processing device to operate in a specific manner, such that the instructions stored in the computer-readable memory can form a manufactured product, including an implementation apparatus that implements a specified function. The computer program instructions can also be loaded onto a computer or other programmable data processing devices, such that a series of operating steps are performed on the computer or other programmable device to produce a computer-implemented process, such that the instructions executed on a computer or other programmable data processing device can provide steps for implementing specified functions.

The above specific description has been described with reference to various embodiments. However, those skilled in the art would have appreciated that various modifications and changes could have been made without departing from the scope of the disclosure. Therefore, consideration of the disclosure will be in an illustrative rather than a restrictive sense, and all such modifications will be included within the scope thereof. Likewise, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising" and any other variants thereof used herein are non-exclusive, such that the process, method, document, or device that includes a list of elements includes not only these elements, but also other elements that are not explicitly listed or do not belong to the process, method, system, document, or device. Furthermore, the term "coupling" and any other variations thereof used herein refer to physical connection, electrical connection, magnetic connection, optical connection, communication connection, functional connection, and/or any other connection.

The above embodiments merely represent several embodiments, giving specifics and details thereof, but should not be understood as limiting the scope of the disclosure thereby. It should be noted that those of ordinary skill in the art would have also made several variations and improvements without departing from the concept of the disclosure, and these variations and improvements would all fall within the scope of protection of the disclosure. Therefore, the scope of protection of the disclosure shall be in accordance with the appended claims.

What is claimed is:

1. A method for setting multiple working modes of a medical device, performed by the medical device and comprising:
obtaining medical data of a monitored object;
determining a vital sign state of the monitored object according to the medical data, wherein the vital sign state comprises a surgical induction state, a surgical maintenance state, and a surgical recovery state;
determining from a working mode library, a target working mode corresponding to the vital sign state, wherein the working mode library comprises a plurality of working modes, and provides a correspondence between each working mode and a corresponding vital sign state, wherein the target working mode is selected from a surgical induction mode corresponding to the surgical induction state, a surgical maintenance mode corresponding to the surgical maintenance state, and a surgical recovery mode corresponding to the surgical recovery state;

automatically executing the target working mode on the medical device; and switching among the surgical induction mode, the surgical maintenance mode and the surgical recovery mode according to changes in the vital sign state of the monitored object, wherein the target working mode comprises a workflow set, a tool set associated with the workflow set, and constraint conditions for executing workflows in the workflow set, the tool set associated with the workflow set is a set of application tools, and each of the application tools is a module used during execution of a workflow of the medical device for implementing a specific function; and automatically executing the target working mode comprises:

automatically executing in sequence the workflows in the workflow set according to the constraint conditions, calling application tools associated with the workflows during execution, and loading functions implemented by the application tools.

2. The method of claim 1, wherein the medical data comprises any one or more of: personal information data, physiological data, nursing data, or treatment data of the monitored object.

3. The method of claim 1, wherein obtaining the medical data of the monitored object comprises any one or more of:

reading the medical data of the monitored object from a wearable device of the monitored object;

searching for the medical data corresponding to the monitored object from an electronic medical record system;

identifying the medical data from a signal of a vital sign parameter acquired by a vital sign parameter acquisition apparatus; and receiving the medical data about the monitored object that is entered by a user.

4. The method of claim 1, wherein the vital sign state comprises a neonatal intensive care state and a neonatal general care state, and the target working mode comprises a neonatal intensive care mode corresponding to the neonatal intensive care state and a neonatal general care mode corresponding to the neonatal general care state; and the method further comprises:

when it is determined that the vital sign state of the monitored object has changed from the neonatal intensive care state to the neonatal general care state, determining that the target working mode is to be switched from the neonatal intensive care mode to the neonatal general care mode; or the vital sign state comprises a condition monitoring state and a condition recovery state, and the target working mode comprises a condition monitoring mode corresponding to the condition monitoring state and a condition recovery mode corresponding to the condition recovery state; and the method further comprises:

when it is determined that the vital sign state of the monitored object has changed from the condition monitoring state to the condition recovery state, determining that the target working mode is to be switched from the condition monitoring mode to the condition recovery mode.

5. The method of claim 1, comprising:

when it is determined that the vital sign state of the monitored object is the surgical induction state, selecting the target working mode as the surgical induction mode, wherein the surgical induction mode comprises display interface layout configuration information and workflow configuration information related to the medical device during a surgical induction stage;

when it is determined that the vital sign state of the monitored object has changed from the surgical induction state to the surgical maintenance state, switching the target working mode from the surgical induction mode to the surgical maintenance mode, wherein the surgical maintenance mode comprises display interface layout configuration information and workflow configuration information related to the medical device during a surgical maintenance stage; and when it is determined that the vital sign state of the monitored object has changed from the surgical maintenance state to the surgical recovery state, switching the target working mode from the surgical maintenance mode to the surgical recovery mode, wherein the surgical recovery mode comprises display interface layout configuration information and workflow configuration information related to the medical device during a surgical recovery stage.

6. The method of claim 1, wherein determining the vital sign state of the monitored object according to the medical data comprises:

obtaining a monitoring scenario selected by a user for the monitored object, wherein the monitoring scenario is associated with one or more vital sign states; and determining, based on the medical data, one of the vital sign states associated with the monitoring scenario as a current vital sign state of the monitored object.

7. The method of claim 1, wherein the target working mode comprises at least one of display interface layout configuration information of the medical device and workflow configuration information of the medical device.

8. The method of claim 1, further comprising:

receiving a processing instruction for the target working mode, wherein the processing instruction comprises any one or more of: editing, addition, and deletion of the plurality of working modes in the working mode library; and processing the target working mode according to the processing instruction.

9. The method of claim 1, wherein in a neonatal intensive care mode, the workflow set comprises a multi-parameter monitoring workflow, and the tool set associated with the workflow set comprises four application tools: an apnea analyzer, a physiological parameter value distribution statistics module, a critical congenital heart disease screening module, and a discharge evaluation module.

* * * * *